US008832993B1

(12) United States Patent
Emmons, Sr. et al.

(10) Patent No.: US 8,832,993 B1
(45) Date of Patent: Sep. 16, 2014

(54) ILLUMINATED AERATOR DIP NET SYSTEM

(71) Applicants: Todd O. Emmons, Sr., Hudson, FL (US); Teresa C. Emmons, Hudson, FL (US)

(72) Inventors: Todd O. Emmons, Sr., Hudson, FL (US); Teresa C. Emmons, Hudson, FL (US)

(*) Notice: Subject to any disclaimer, the term of this patent is extended or adjusted under 35 U.S.C. 154(b) by 38 days.

(21) Appl. No.: 13/775,053

(22) Filed: Feb. 22, 2013

Related U.S. Application Data

(60) Provisional application No. 61/601,913, filed on Feb. 22, 2012.

(51) Int. Cl.
*A01K 97/05* (2006.01)
(52) U.S. Cl.
CPC .................................. *A01K 97/05* (2013.01)
USPC ........... 43/57; 43/55; 43/26.1; 43/17.5; 43/56
(58) Field of Classification Search
USPC .............................. 43/55–57, 26.1, 17.5, 54.1
IPC ............................................. A01K 97/04,97/05
See application file for complete search history.

(56) References Cited

U.S. PATENT DOCUMENTS

| 2,678,512 | A | * | 5/1954 | Maston | 43/57 |
| 2,970,401 | A | * | 2/1961 | Hays | 43/57 |
| 3,323,249 | A | * | 6/1967 | Randall | 43/57 |
| 3,831,310 | A | * | 8/1974 | Frangullie | 43/56 |
| 4,261,131 | A | * | 4/1981 | Poffenberger | 43/57 |
| 5,077,932 | A | * | 1/1992 | Hetherington | 43/57 |
| 6,877,268 | B2 | * | 4/2005 | Kutzner | 43/44.89 |
| 6,886,291 | B1 | * | 5/2005 | Jaggers | 43/56 |
| 7,644,535 | B2 | * | 1/2010 | Sloop | 43/56 |
| 2002/0020104 | A1 | * | 2/2002 | Kolar et al. | 43/55 |

* cited by examiner

*Primary Examiner* — Darren W Ark
*Assistant Examiner* — Kathleen Alker

(57) ABSTRACT

An illuminated aerator dip net system is submerged into a body of water within a container. The dip net assembly has a net with a rigid air tube and lid with a handle attached as one unit. An aerator is attached to the top of the lid. A flexible air tube is connected to an air valve, which is attached to the rigid air tube. The aerator pumps oxygen through the air valve and through the rigid air tube to an air stone that is attached to the bottom of the net thereby oxygenating the body of water within the container keeping the bait alive. The aerator provides an electrical source and switch for a light that is mounted to the bottom side of the aerator. A hole provided in the lid of the dip net assembly allows the light to illuminate live bait within the container.

7 Claims, 5 Drawing Sheets

ILLUMINATED AERATOR DIP NET SYSTEM

CROSS-REFERENCE TO RELATED APPLICATION

This application claims the benefit of U.S. Provisional application 61/601,913 filed on Feb. 22, 2012

FEDERALLY SPONSORED RESEARCH

None.

SEQUENCE LISTING

None.

FIELD OF INVENTION

The present invention relates generally to fishing with live bait by way of aerating, illuminating and netting live bait, within a container of water.

BACKGROUND OF THE INVENTION

Use of aeration, netting of bait and illumination of water in known design and configurations is known in the prior art. More specifically aerating the water in known design and configurations previously devised and utilized for the purposed of providing sufficient oxygenation through known methods and apparatuses are known to consist basically of familiar, expected, and obvious structural configurations, notwithstanding the myriad of design encompassed by the crowded prior art which has been developed for fulfillment of countless objectives and requirements.

By way of example, U.S. Pat. No. 4,462,180 issued Jul. 31, 1984 to Scott related to Bait Container with illumination and aeration. U.S. Pat. No. 4,502,240 issued Mar. 5, 1985 to Kapucinski related to Dip net and bucket aerator. U.S. Pat. No. 5,077,932 issued Jan. 7, 1992 to Hetherington related to Water Aeration. U.S. Pat. No. 5,799,435 issued Sep. 1, 1998 to Stafford related to a Live Bait Bucket to oxygenate water. U.S. Pat. No. 6,820,364 issued Nov. 23, 2004 to Tyson related to Lighted bait container. Lastly, U.S. Pat. No. 7,644,535 issued Mar. 12, 2009 to Sloop related to Aerated Bucket and bait retrieval assembly.

While these devices fulfill their respective, particular objectives and requirements, the aforementioned patents do not describe an illuminated aerator dip net system that allows illumination aeration and netting of live bait within a container.

In this respect, the illuminated aerator dip net system according to the present invention substantially departs form the conventional concepts and designs of the prior art, and in doing so provides an apparatus primarily developed to the purpose of, illuminating, aerating and netting live bait within a container.

Therefore, it can be appreciated that there exists a continuing need for a new and improved illuminated, aerator dip net system. In this regard, the present invention substantially fulfills this need.

SUMMARY OF THE INVENTION

In view of the foregoing disadvantages inherent in the known types of illuminated aeration dip net systems and apparatuses of know designs and configurations now present in the prior art, the present invention provides an new and improved illuminated aeration dip net system. As such, the general purposed of the present invention, which will be described subsequently in greater detail, is to provide a new and improved illuminated, aeration dip net system and method which has all the advantage of the prior art and none of the disadvantages.

To attain this, the present invention essentially comprises of illuminated, aerator dip net system. First provided is a dip net assembly. The dip net assembly has a rigid net, a rigid air tube, which then attaches to the center of the rigid net. The rigid net and rigid air tube are attached to the center of a lid. The lid has a handle. The lid has a door to release bait into. Then provided is a container with a body of water. The dip net assembly is submerged into the water. Live bait can be hand selected by lifting up on the lid handle to gain access to the bait from all sides of the rigid net.

Provided next is an aerator. The aerator is affixed to the top of the lid. The aerator has a flexible air tube. The air tube is attached to an air valve and cap at the top of the rigid air tube and lid. On the bottom of the rigid air tube and rigid net, is a cap with an air stone attached to the sidewall of the cap. When the dip net is submerged into the containers body of water the aeration runs through the rigid air tube down through to the bottom of the rigid net, the air stone creates bubbles and oxygenates the water to keep the bait alive.

The aerator has an electrical source. Attached on the underside of the aerator is an LED light. The aerator has an electrical switch to turn on and off the aerator. The LED light has a switch in which to turn on and off the led light. The bottom side of the aerator is then attached to the top of the lid and the LED light penetrates through a hole in the lid to illuminate the bait in the containers body of water.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

It is therefore an advantage of the present invention to provide and new and improved illuminated aerator dip net system which has all of the advantages of the prior art illuminated aerator dip net systems of known designs and configurations and none of the disadvantages.

It is another advantage of the present invention to provide a new and improved illuminated aerator dip net system which may be easily and efficiently manufactured and marketed.

It is a further advantage of the present invention to provide a new and improved illuminated aerator dip net system which is of durable and reliable constructions.

It is a further advantage of the present invention to provide a new and improved illuminated aerator dip net system which is susceptible of a low cost of manufacture with regard to both materials and labor, and which accordingly is then susceptible of low prices of sale to the consuming public, thereby making such illuminated aerator dip net system economically available to the buying pubic.

Even still another advantage of the present invention is to provide the illuminated aerator dip net system to make ease of fishing with live bait from a container of water.

Lastly, it is an advantage of the present invention to provide a new and improved illuminated aerator dip net system. A dip net assembly is adapted with an aerator and a LED light to be used within a container of water for live bait fishing.

These together with other advantages of the invention, along with the various features of novelty which characterize the invention, are pointed out with particularity in the claims annexed to and forming a part of this disclosure. For a better understanding of the invention, its operating advantages and the specific advantages attained by it uses, reference should be had to the accompanying drawings and descriptive matter in which there is illustrated preferred embodiments of the invention.

BRIEF DESCRIPTION OF THE DRAWINGS

The invention will be better understood and advantages other than those set forth above will become apparent when consideration is given to the following detailed description thereof. Such description makes reference to annexed drawings wherein.

DETAILED DESCRIPTION

Figure 1:
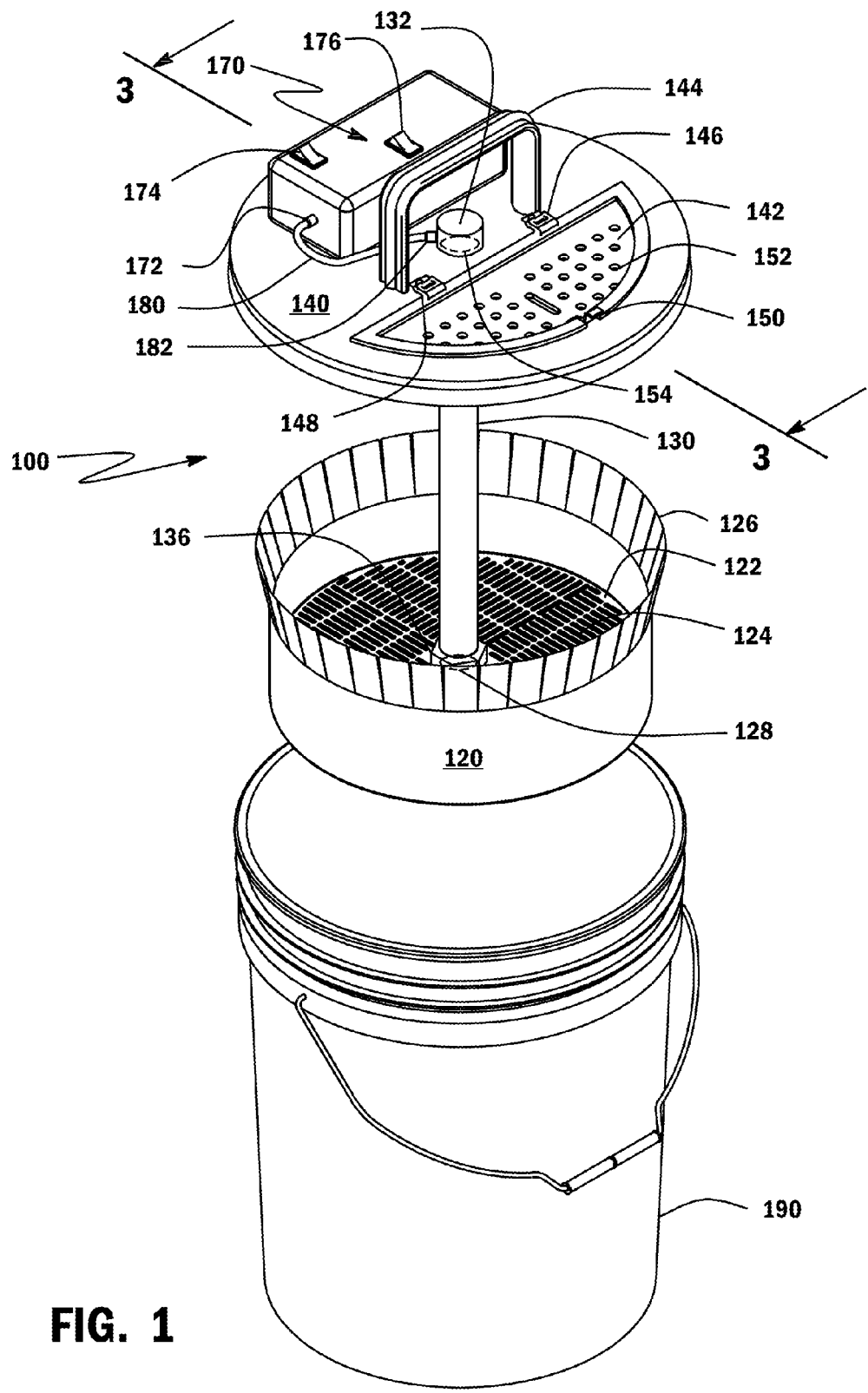
FIG. 1 is a downward perspective view of an illuminated aerator dip net system and a container as referenced.

FIG. 1 is a downward perspective view of an illuminated aerator dip net system with a container 190 provided. Comprising first of a dip net assembly 100 in accordance with at least one embodiment. A rigid net 120 having a net bottom 122, on the net bottom 122 contains holes 124 to allow water to pass through. On the upper portion of the rigid net 120 is a segmented flange 126 that rides the sides of the container 190. In the center of the net bottom 122 a hole 128 that the rigid air tube 130 is inserted through attached by a fitting 136 and cap 134 of FIG. 2.

Figure 2:
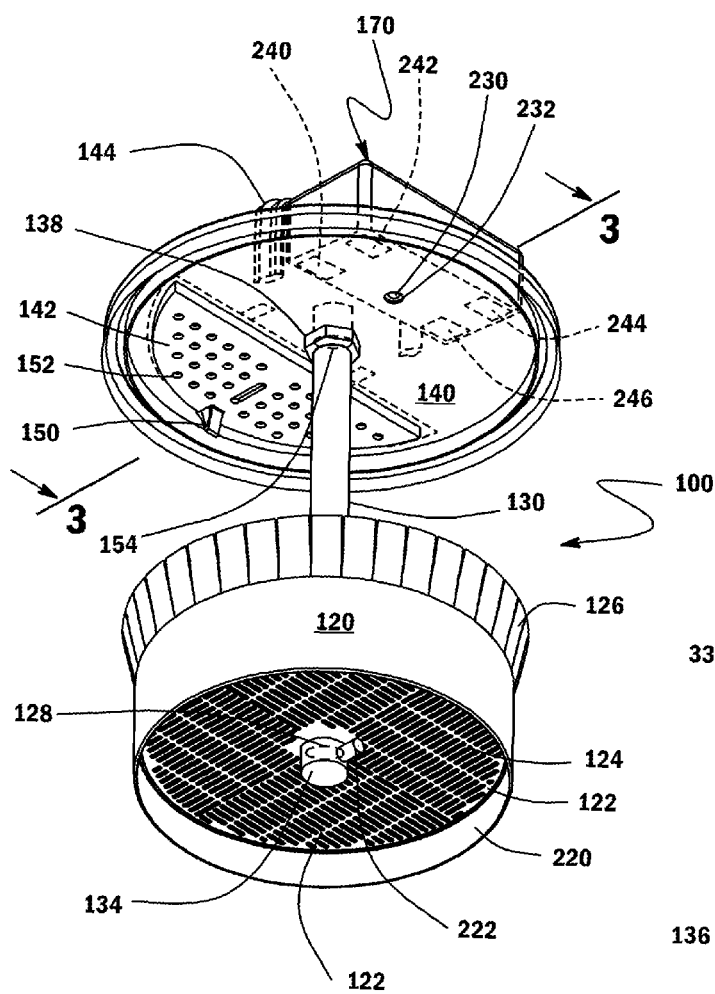
FIG. 2 is an upward perspective view of an illuminated aerator dip net system.

The upper portion of the dip net assembly 100 has a lid 140 in the center of the lid 140 a hole 154 that the rigid air tube 130 is inserted though attached by a fitting 138 of FIG. 2 and cap 132. Lid 140 contains a handle 144 to lift the dip net assembly 100 out of the container 190. In the lid 140 has a door 142. Door 142 comprises of hinges 146 and 148, a latch 150 along with holes 152. An aerator assembly 170 is affixed to the top of the lid 140. The aerator assembly has an independent switch 174 to turn on and off, along with a pump nozzle 172.

Plugged into the pump nozzle 172 is a flexible air tube 180. The flexible air tube 180 attaches to an air valve 182 that fits into the sidewall of the cap 132.

The dip net assembly 100 can be formed in a variety of shapes such as circular, square, triangle etc. and be manufactured with composite material such as polyethylene, PVC (vinyl) and the like.

FIG. 2 is an upward perspective view of an illuminated aerator dip net system showing the underside of the dip net assembly 100. Along the bottom of the rigid net 120 has a net rim 220. At the net bottom 122 the rigid air tube 130 is inserted through hole 128 and is attached with a fitting 136 of FIG. 1. A cap 134 is attached to the rigid air tube 130 along with the air stone 222 inserted into the sidewall of the cap 134. At the upper portion of the rigid air tube 130 is the lid 140. The lid 140 is secured to the rigid air tube 130 by inserting the rigid air tube 130 through the hole 154 and attached with a fitting 138.

Shown on the underside of the lid 140, is a ghost image of the aerator assembly 170. Velcro a hook and loop type fastener, or like removable mounting material 240, 242, 244, and 246 illustrates how the aerator assembly 170 is attached to the top of the lid 140. An LED light 230 is adapted to the aerator assembly 170. The LED light 230 has an independent switch 176 to turn on and off. A hole 232 in the top of the lid 140 provides space for the LED light 230 to project downward and illumination the inside of the rigid net 120.

The aerator assembly 170 can run in conjunction with the LED light 230 or can be separately switched. When switched on with switch 174 and 176 at the same time thus illuminating and aerating the bait within the said container 190.

Figure 2A:
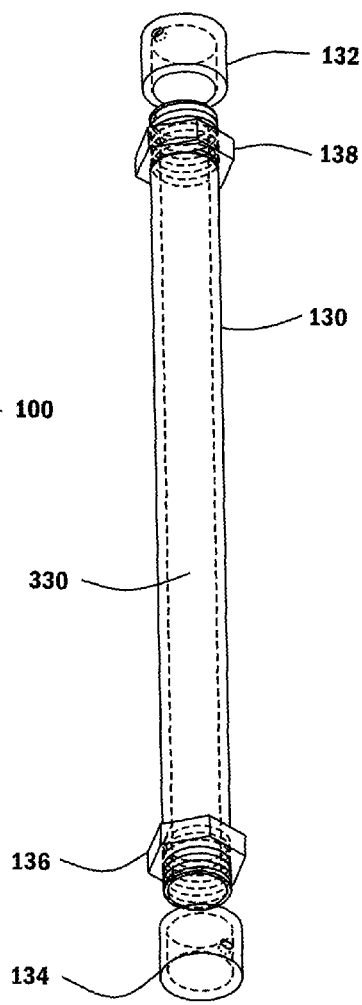
FIG. 2a is a perspective view of the rigid air tube of FIGS. 1 and 2.

FIG. 2a is a perspective view of the rigid air tube 130 of FIGS. 1 and 2. The cap 134 is attached to the rigid air tube 130 to secure the rigid net 120 and tighten down with a fitting 136. The rigid air tube fits through the center of the lid 140 and is secured by a fitting 138 and cap 132. A dashed image of the air chamber 330 runs through the center of the rigid air tube 130 to the cap 132. This allows the aerator assembly 170 to send oxygen through the rigid air tube 130 air chamber 330 to keep the bait alive.

The connections to the rigid net 120 the rigid air tube 130 and the lid 140 could be threaded connections, friction fitted together, quick release or glued and be manufactured with composite material such as polyethylene, PVC (vinyl) and the like.

Figure 3:
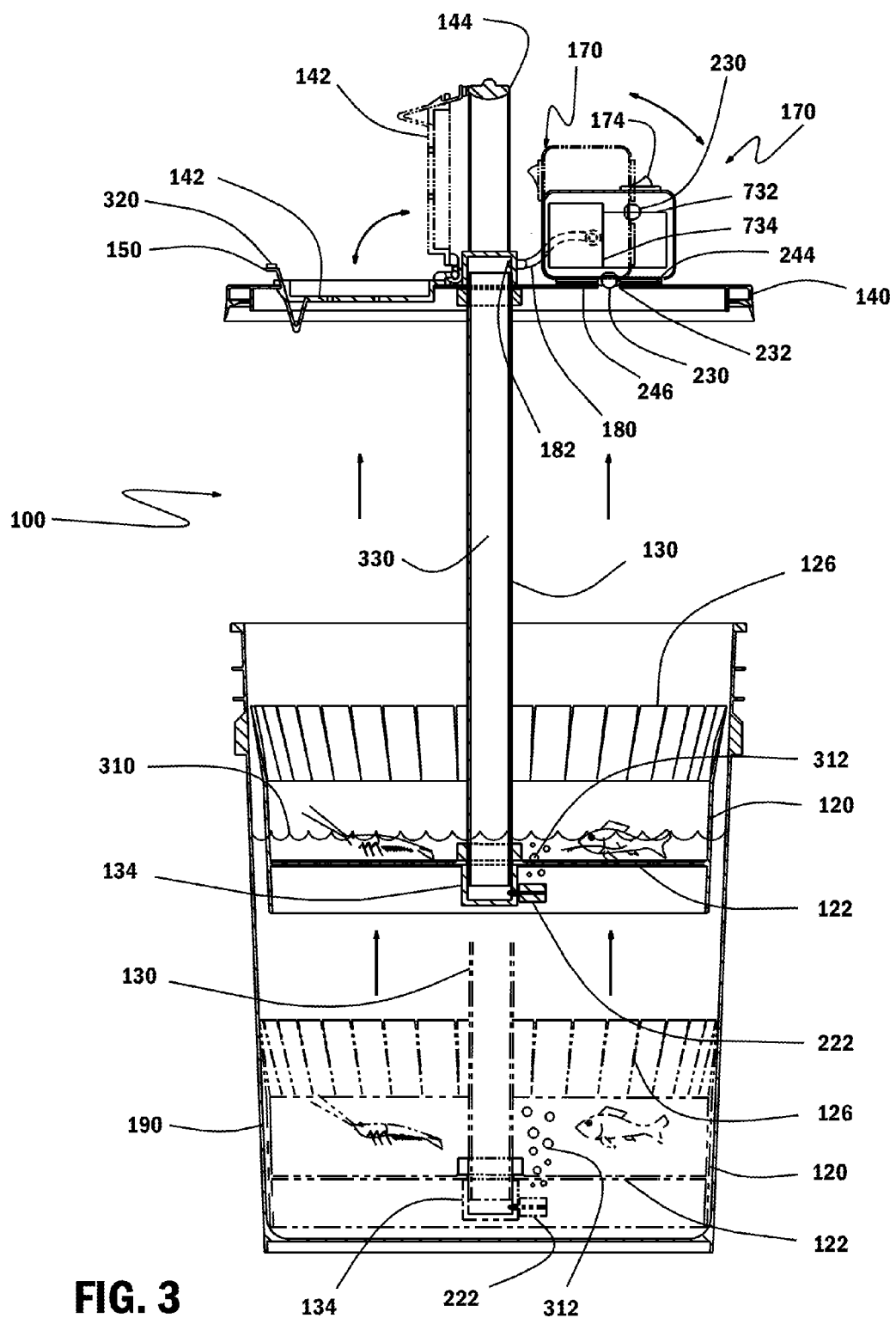
FIG. 3 is a lateral cross-sectional view of the illuminated aerator dip net system of FIGS. 1, 2 and 2a with additional embodiments.

FIG. 3 is a lateral cross-sectional view of the illuminated aerator dip net system of FIGS. 1, 2 and 2a with additional embodiments. This cross-section view of a container 190 is provided, within the container 190 is water 310. The section has a ghost image of the dip net assembly 100 submerged in the water 310 to the bottom of the container 190. When the dip net assembly 100 is lifted by the lid 140 handle 144 to the top of the water 310 the bait is also lifted within the rigid net 120 and the rigid net 120 holes 124 allows the water 310 to pass through. This gives ease of access to the bait from all around the inside of the rigid net 120.

Container 190 and the rigid net 120 can be constructed with a taper or straight in the sidewall. The segmented flange 126 is provide on the rigid net 120 that rides the sidewalls of the container 190 when submerge or lifted from the water 310 to allow containment of the bait within the rigid net 120 and container 190.

When the dip net assembly 100 and the aerator assembly 170 are assembled as one unit it works as an aeration system. As the aerator assembly 170 is switched to the on position oxygen is sent through the aerator assembly 170 through the flexible air tube 180 air valve 182 cap 132 through the rigid air tube 130 air chamber 330 and down to the net bottom 122 through the air stone 222 cap 134. The release of oxygen 312 then is disbursed into the container 190 of water 310 to keep the bait alive.

The aerator assembly 170 is shown on top of the lid 140 attached with the Velcro a hook and loop type fastener, or like removable mounting material 240, 242, of FIGS. 2, 244 and 246. The LED Light 230 is shown laying over the hole 232 of the lid 140 to illuminate the bait in the container 190. The aerator assembly 170 has a motor 732, and a pump 734 inside. There is a ghost image of the aerator assembly 170 in an upward position with the LED light 230 shinning outward so as to be utilized as a flash light. The door 142 to the lid 140 is being shown in a ghosted open position resting against the a hook and loop type fastener, 320 or a latch molded into the handle 144, attached to the handle 144 and latch 150 this allows the bait to be released into the container 190 of water 310.

Figure 4:
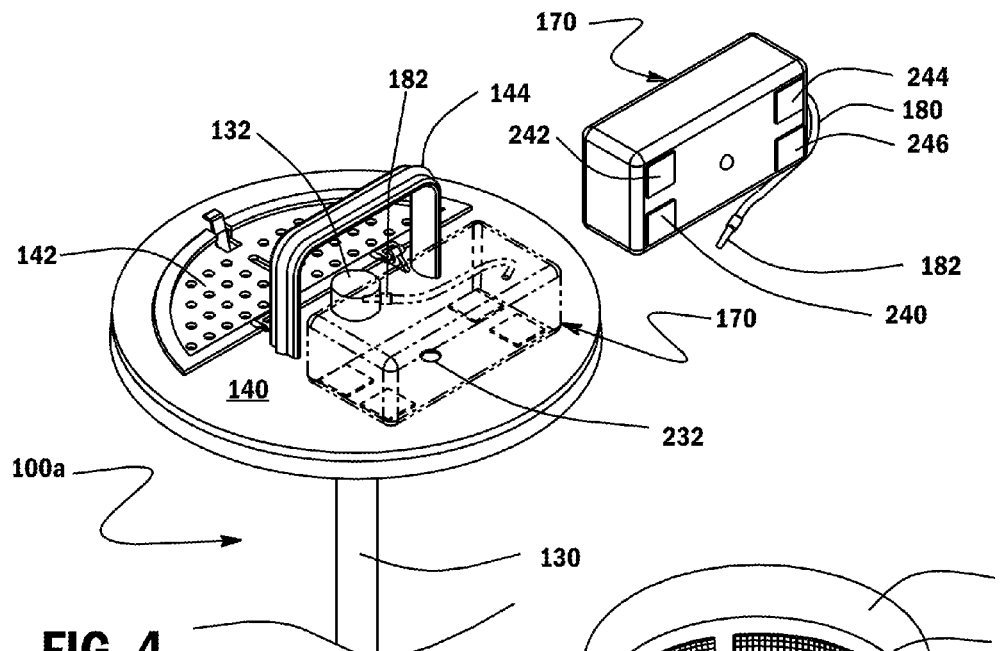
FIG. 4 is a downward view and partial perspective view of the illuminated aerator dip net system with additional embodiments

FIG. 4 is a downward view and partial perspective view of the illuminated aerator dip net system with alternate embodiments. The aerator assembly 170 is removable allowing the dip net assembly 100a to function with out it.

Figure 5:
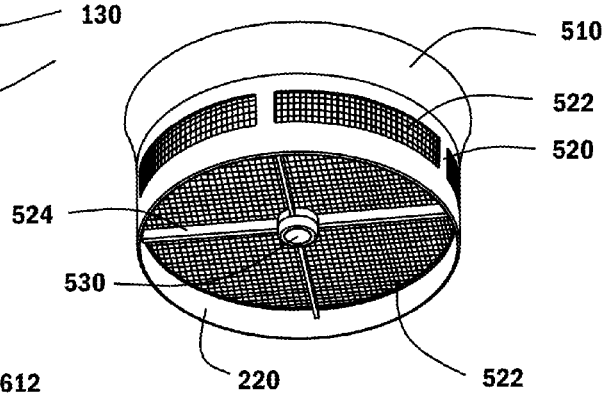
FIG. 5 is an upward perspective of the dip net assembly's net with alternative embodiments.

FIG. 5 is an upward perspective and section view of the dip net assembly 100 with alternate embodiments. A net 520 has a screen 522 and a flexible fin 510. Along the bottom of the net 520 is the rim 220, screen 522. The screen 522 is attached to the net support 524 along with an air stone fitting 530. The net 520 flexible fin 510 and screen 522 material can be constructed of fabric, plastic, vinyl, polyethylene or like composite that is noncorrosive in nature such as stainless steel or the like.

Figure 6:
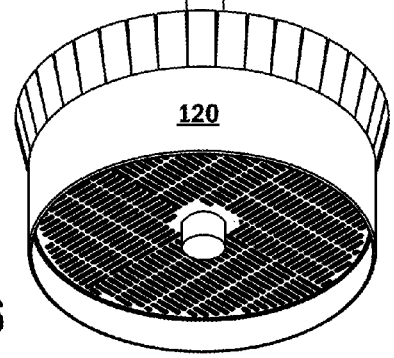
FIG. 6 is an upward perspective of the dip net assembly's handle and adjustable rigid air tube with additional alternative embodiments.

FIG. 6 is an upward perspective of the dip net assembly 100b handle fitting 610 with adjustable rigid air tube 612 with an alternate embodiment. Dip net assembly 100b handle fitting 610 is connected to the rigid air tube 130 and the rigid net 120 or net 520 as an alternative to the dip net assembly 100 lid 140. The rigid air tube 130 illustrates having an adjustable connection 612 for different depths of containers 190. Construction material can be of plastic, vinyl, polyethylene or like composite that is noncorrosive in nature such as stainless steel or the like.

Figure 7:
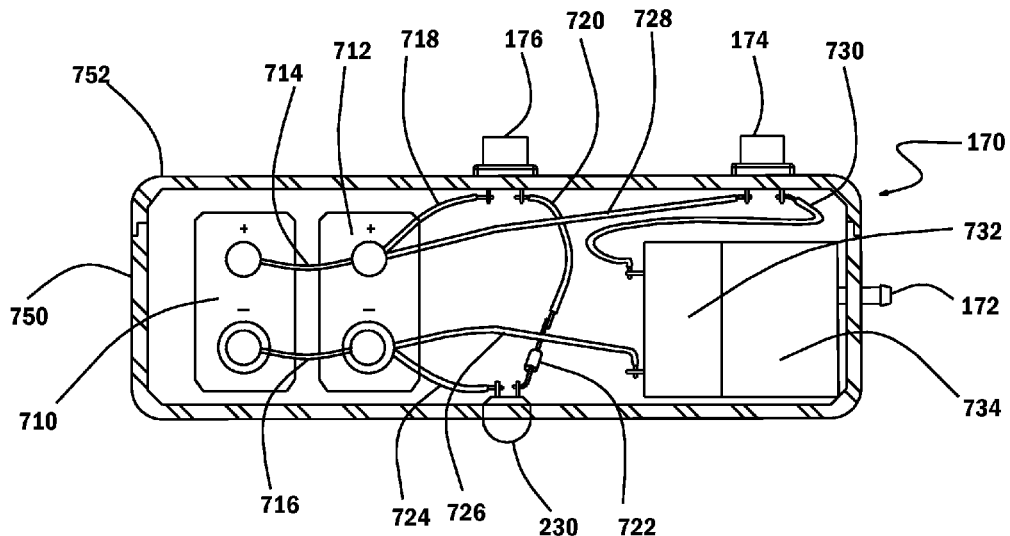
FIG. 7 is a side view of the wiring for the aeration assembly with additional embodiments of the wiring for an LED light.

FIG. 7 is a side view of the operating system for the aerator assembly 170 with additional embodiments of the wiring for an LED light 230. Around the aerator assembly 170 is an enclosure 750 and an enclosure lid 752. The enclosure 750 contains batteries 710 and 712. The batteries 710 and 712 can be accessed through the enclosure lid 752. A motor 732, is attached to a pump 734, and an LED light 230 are within the enclosure 750. Through the sidewall of the enclosure 734 contains a pump nozzle 172 connected to the pump 734.

Motor 732 operates on direct current as supplied by the batteries 710 and 712. Batteries 710 and 712 will be adapted to the power requirements of the motor and LED light 230 and could be adapted with nine volts. Batteries 710 and 712 can be joined in parallel through the jumpers 714 and 716.

Figure 8:
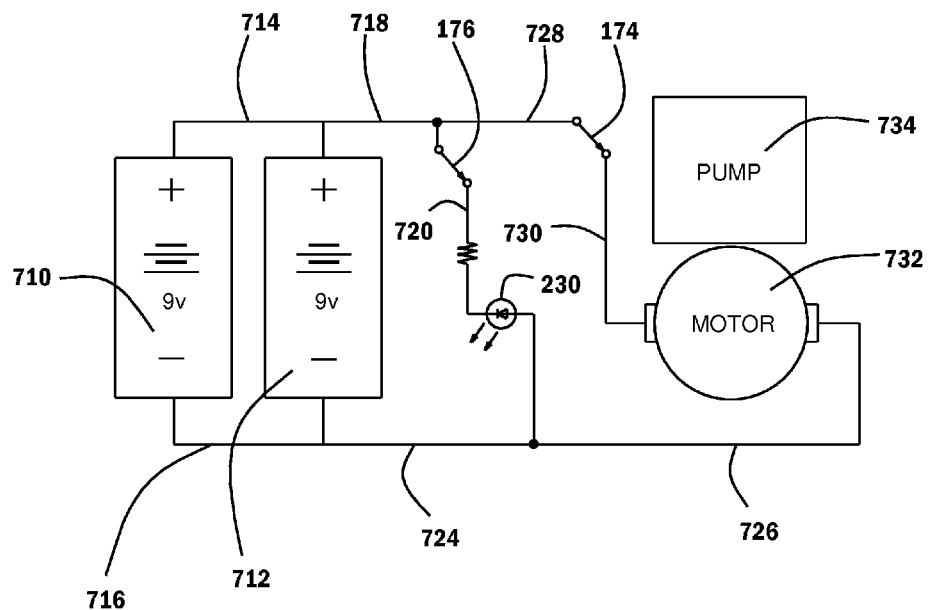
FIG. 8 is the wiring diagram for the aeration assembly and LED light.

Connection of the motor 732 and the batteries 710 and 712 can be by any suitable circuit. A suitable circuit is shown in FIGS. 7 and 8. The batteries 710 and 712 are connected to the power switch 174 through a path 728. The power switch 174 is connected by a path 730 to the motor 732 and a path 726 to complete the circuit.

Connection of the LED light 230 and the batteries 710 and 712 can be by any suitable circuit a suitable circuit is shown in FIGS. 7 and 8. The batteries 710 and 712 are connected to the power switch 176 through a path 718. LED light 230 can be in a path 720 with a suitable limiting resistor 722. A path 724 is provided to complete the circuit.

FIG. 8 is the wiring diagram for the aeration assembly 170 and LED light 230 of FIG. 7.

| Drawings-Reference Numerals | |
| --- | --- |
| 100 | Dip Net Assembly |
| 120 | Rigid Net |
| 122 | Net Bottom |
| 124 | Holes |
| 126 | Segmented Flange |
| 128 | Hole |
| 130 | Rigid Air Tube |
| 132 | Cap |
| 134 | Cap |
| 136 | Fitting |
| 138 | Fitting |
| 140 | Lid |
| 142 | Door |
| 144 | Handle |
| 146 | Hinge |
| 148 | Hinge |
| 150 | Latch |
| 152 | Holes |
| 154 | Hole |
| 170 | Aerator Assembly |
| 172 | Pump Nozzle |
| 174 | Switch |
| 176 | Switch |
| 180 | Flexible air tube |
| 182 | Air Valve |
| 190 | Container |
| 220 | Net Rim |
| 222 | Air Stone |
| 230 | LED Light |
| 232 | Hole |
| 240 | Hook and Loop Type Fastener |
| 242 | Hook and Loop Type Fastener |
| 244 | Hook and Loop Type Fastener |
| 246 | Hook and Loop Type Fastener |
| 310 | Water |
| 312 | Oxygen |
| 320 | Hook and Loop Type Fastener |
| 330 | Air Chamber |
| 510 | Flexible Fin |
| 520 | Net |
| 522 | Screen |
| 524 | Net Support |
| 530 | Air Stone Fitting |
| 610 | Handle Fitting |
| 612 | Adjustable Connection |
| 710 | Battery |
| 712 | Battery |
| 714 | Jumper |
| 716 | Jumper |
| 718 | Path |
| 720 | Path |
| 722 | Limiting Resister |
| 724 | Path |
| 726 | Path |
| 728 | Path |
| 730 | Path |
| 732 | Motor |
| 734 | Pump |
| 750 | Enclosure |
| 752 | Enclosure Lid |

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

The invention claimed is:

1. An illuminated aerator dip net system comprising:
    a dip net assembly comprising:
        a net having a plurality of holes to allow water to pass through as said net is lifted from a container of water, an upper portion having a flexible flange to ride sides of said container as said net is lifted from said container, and a net bottom;
        a lid having a handle to lift said dip net assembly, an illumination hole, and a hinged door, wherein when in an open position, said hinged door rests against and attaches to said handle to allow bait to be disposed into said container; and
        a rigid air tube having an air chamber, a first end, and a second end, said first end located in a center hole of said lid and secured by a first cap above said lid, an air valve attached to a sidewall of said first cap, and said second end located in a center hole of said net bottom and secured by a second cap below said net bottom, an air stone inserted into a sidewall of said second cap for releasing oxygen into said water in said container; and
    an aerator assembly removably affixed to a top surface of said lid, said aerator assembly comprising:
        an enclosure, said enclosure housing:
            a pump;
            a motor attached to said pump; and
            batteries;
            a light emitting means located on an underside of said enclosure and in said illumination hole in said lid to illuminate said bait within said container;
            a first switch for operation of said motor;
            a second switch for operation of said light emitting means;
            a pump nozzle connected to said pump; and
            a flexible air tube connecting said pump nozzle to said air valve;
        wherein when said first switch is turned on, said aerator assembly pumps oxygen through said pump nozzle into said flexible air tube, through said rigid air tube and out said air stone, oxygenating said water within said container to keep said bait alive.

2. The system of claim 1, wherein said net is constructed from fabric, plastic, vinyl, polyethylene, stainless steel or like composite that is noncorrosive in nature.

3. The system of claim 1, wherein said dip net assembly is manufactured in a variety of shapes.

4. The system of claim 3, wherein said dip net assembly is constructed from plastic, vinyl, polyethylene, stainless steel or like composite that is noncorrosive in nature.

5. The system of claim 1, wherein said rigid air tube has an adjustable connection thereby allowing said dip net assembly to be adapted to fit a variety of different size containers.

6. The system of claim 1, wherein said batteries are nine-volt batteries, and said aerator assembly further comprises a limiting resister in line with said light emitting means.

7. The system of claim 1, wherein said flexible flange is a segmented flange.

* * * * *